United States Patent [19]

Nelson

[11] 3,758,709

[45] Sept. 11, 1973

[54] SINGLE TUBE COLOR CAMERA WITH CROSSED GRID GRATINGS WITH ADJACENT LINE SIGNAL AVERAGING TO ELIMINATE VERTICAL SCENE MODULATION

[75] Inventor: Alfred M. Nelson, Redondo Beach, Calif.

[73] Assignee: The Magnavox Company, Torrance, Calif.

[22] Filed: June 8, 1970

[21] Appl. No.: 44,411

[62] Division of Ser. No. 831,029, June 6, 1969, Pat. No. 3,647,943

[52] U.S. Cl. .......................................... 178/5.4 ST
[51] Int. Cl. .......................................... H04n 9/06
[58] Field of Search .............................. 178/5.4 ST

[56] References Cited

UNITED STATES PATENTS 3,560,637 2/1971 Takeuchi et al. ............ 178/5.4 ST

*Primary Examiner*—Robert L. Griffin
*Assistant Examiner*—George G. Stellar
*Attorney*—Smyth, Roston and Pavitt

[57] ABSTRACT

This invention relates to a system for, and method of, reproducing a color image from a composite black-and-white image. The composite black-and-white image is formed either on an exposure or is formed from a live image. In either case, modulations are provided in a first particular line pattern to obtain a representation of a first particular color. Modulations are also provided in a second particular line pattern different from the first particular line pattern to obtain a representation of a second particular color. The third color may be unmodulated. The three colors add optically to form the image luminance.

To reproduce the color image, signals are provided by scanning the composite image. Means are provided for operating upon such signals in accordance with the modulations in the first particular line pattern to produce signals representating the first particular color. Means are also provided for operating upon the signals representing the composite image in accordance with the modulations in the second particular line pattern to produce signals representing the second particular color. The signals representing the first and second particular colors are then used in conjunction with the luminance to reproduce the color image.

7 Claims, 9 Drawing Figures

INVENTORS:
Alfred M. Nelson
Daniel J. Marshall
By Smyth, Roston & Pavitt
ATTORNEYS Patented Sept. 11, 1973 3,758,709

2 Sheets-Sheet 2

INVENTORS.
Alfred M. Nelson
Daniel J. Marshall
By Smyth, Roston & Pavitt
ATTORNEYS

SINGLE TUBE COLOR CAMERA WITH CROSSED GRID GRATINGS WITH ADJACENT LINE SIGNAL AVERAGING TO ELIMINATE VERTICAL SCENE MODULATION

CROSS-REFERENCES TO RELATED APPLICATIONS

This is a division of application Ser. No. 831,029, filed June 6, 1969 now U.S. Pat. No. 3,647,943.

This invention relates to a system for, and method of, reproducing a color image from a composite black-and-white image. The invention is particularly adapted to be used in recording the color image on a monochrome medium and in reproducing the color image from the monochrome medium.

Various attempts have been made to convert a color image into black-and-white representations and to reproduce the color image from the black-and-white representations. These attempts have been made because black-and-white representations are not as expensive as color representations. For example, black-and-white representations are approximately one-third the cost of color representations. Furthermore, color video cameras are quite expensive and complex. Generally the color video cameras constitute a plurality of camera tubes in a single complex package. Because of this, it would be desirable to provide a simplified video camera which would provide color information from a single camera tube.

This invention provides a system for, and method of, recording color information on a black-and-white film and for subsequently reproducing the color information from the black-and-white film. The system constituting the invention records a first color such as blue on the film while modulating the color in a first particular line pattern. The system further records a second color such as red on the film while modulating the color in a second particular line pattern having a different orientation than the first particular line pattern. The system also records a third color such as green on the film without any modulations. The three recordings add optically to form a composite black-and-white image on the film. Any one of the three primary colors can be the unmodulated color.

To reproduce the color information from the black-and-white film, signals are produced to represent the composite by scanning the black-and-white image on the film. The signals representing the composite image are processed to produce the signals representing the luminance in the color image. The signals representing the composite image are also processed to recover the signals representing the first color, such as blue, in accordance with the modulations in the first line pattern. The signals are further processed to recover the signals representing the second color, such as red, in accordance with the modulations in the second line pattern. The signals representing the first and second line patterns in conjunction with the luminance signal are then processed to reproduce the signals representing the third color, such as green. The signals representing the luninance of the color image and the signals representing the first, second and third colors are combined to obtain a reproduction of the color image.

The line patterns produced on the composite image may have different relationships within the concept of the invention. In this concept, the lines in the second pattern have a different angular or directional orientation than the lines in the first pattern. In one embodiment, the lines in the first pattern cause modulations at a first frequency to be produced and the lines in the second pattern cause modulations to be produced at a second frequency different from the first frequency. The different frequencies are detected in the reproducing system to seperate the signals representing the first color from the signals representing the second color.

The description above has proceeded on the basis of the production of a composite image on black-and-white film. It will be appreciated that the systems and methods constituting this invention may also be used with a color camera to produce signals representing a composite image so that the signals may be transmitted, as in a closed circuit, to a color television receiver. When an image is viewed live by a camera, filters are provided in the camera to provide line patterns similar to those described above. For example, filter lines in a first pattern may subtract blue from the color and filter lines in a second pattern may subtract red from the color.

Figure 1:
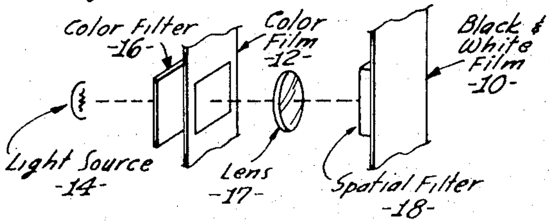
FIG. 1 is a schematic diagram of a system constituting this invention for converting a color image to a composite image on a black-and-white film.

In one embodiment of the invention, a composite image is produced on a black-and-white film generally indicated at 10 in FIG. 1 from a color film generally indicated at 12. The image may be formed by shining light from a source 14 through a color filter 16 and the film 12 to the black-and-white film 10. A filter 18 is disposed between the color film 12 and the balck-and-white film 10. A lens 17 may also be provided for focusing the image from the color film 12 on the black-and-white film 10.

The black-and-white film 10 is exposed several different times to receive the image representing different colors. For example, a first exposure may be provided when the spatial filter 18 modulates the light passed by a blue filter 16. A second exposure may be provided when the spatial filter 18 modulates the light passed by a red color filter 16. Similarly, a third exposure may be provided when the color filter 16 has characteristics to pass only green light.

It is desirable to balance the exposures made by the three color components to produce an overall luminance which is represented by the equation indicated below. This approximates the luminance response of the human eye. This equation is accepted as follows as a standard in the television field:

$Y = 0.587G + 0.299R + 0.114B$, where $Y$ = White light $G$ = Green component $R$ = Red component $B$ = Blue component Because of this, the exposure of the black-and-white film to the green component of light from the image 12 may occur approximately five times greater than the exposure to the blue component of light from the image 12 and approximately three times greater than the exposure to the red component of light from the image 12. This is on the assumption that the film has a substantailly flat spectral response. Adjustments can be made to accommodate for any changes in the response of the film from a spectrally flat spectral response. Ideally, the exposure process should be linear in transmissivity versus exposure.

Figure 2:
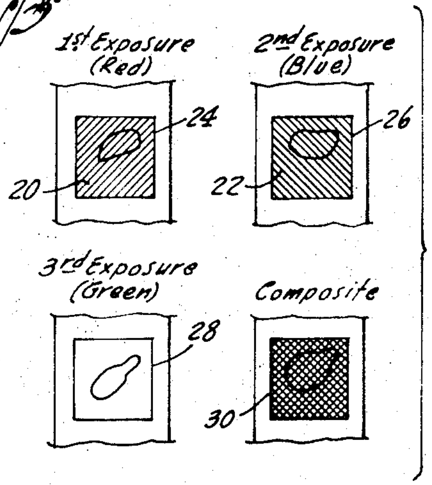
FIG. 2 is a schematic representation of each of a plurality of images superimposed on the black-and-white film in the embodiment shown in FIG. 1 to form the composite image.
Figure 3:
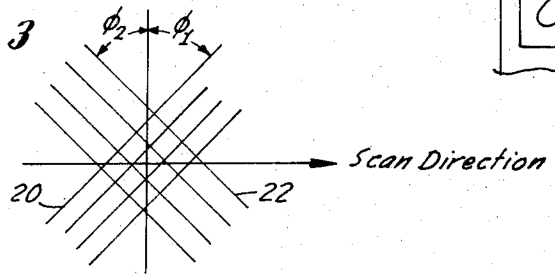
FIG. 3 is an enlarged schematic representation of ratings used in the embodiment shown in FIGS. 1 and 2 to produce the individual images shown in FIG. 2.

The filter 18 is provided with special characteristics when an exposure is being made of the red and blue components in the color film 12. For example, when an exposure is being made to obtain the red components in the color film 12, the spatial filter 18 is provided with a grating comprising a plurality of parallel, equally spaced lines 20 as illustrated in FIG. 2. The lines are disposed in a first direction which is transverse to the direction in which a beam sweeps normally in a television tube. For example, when the beam sweeps horizontally, the lines 20 may have any desired direction other than the horizontal direction. The lines 20 are preferably disposed in a direction to produce signals modulated at a particular frequency such as approximately three megacycles per second. This is accomplished by the following formula which is obtained form the enlarged representation shown in FIG. 3:

$f_1 = Kf_{s1}$ (Cos $\phi_1$), where $f_1$ = the frequency of modulation such as approximately 3 megacycles per second;

$f_{s1}$ = the spatial frequency in cycles per inch of the modulations representing the red color;

$K$ = a constant (scan rate in inches/second); and $\phi_1$ = the angle between the lines 20 and the line normal to the scanning direction of the beam, as shown in FIG. 3.

When an exposure if being made to obtain the blue components in the color film 12, the spatial filter 18 is provided with a grating comprising a plurality of parallel, equally spaced lines 22 as indicated in FIG. 2. The lines 22 are disposed in a direction transverse to the lines 20 and also transverse to the scanning direction. The lines are disposed in an angular direction so that the modulation frequency will be different from that provided by the lines 20. For example, when the lines 20 provide a modulation frequency of approximately 3 megacycles per second, the lines 22 provide a modulation frequency of approximately 2 megacycles per second. The frequency of 2 megacycles per second may also be obtained in part by separating the lines 22 by a greater distance than the lines 20. The line width should always be equal to one-half the spacing between the lines. Actually a sinusoidal grating is preferred.

The production of signals modulated to a particular frequency such as approximately 2 megacycles per second may be seen from the following equation:

$f_2 = Kf_{s2}$ (cos $\phi_2$), where $f_{s2}$ = the spatial frequency in cycles per inch of the modulations representing the blue color;

$f_2$ = the frequency of modulation such as approximately 2 megacycles per second; and $\phi_2$ = the angle between the lines 22 and the line normal to the scanning direction of the beam, as shown in FIG. 3.

$K$ = scan velocity (inches/sec)

The formation of the composite image on the black-and-white film 10 is illustrated schematically in FIG. 2. The first exposure is made through a red filter and the lines 20 are provided on the spatial filter 18 to modulate the exposure so that a resultant image 24 is formed. The second exposure is made through a blue filter and the lines 22 are provided on the spatial filter to modulate the exposure so that a resultant image 26 is formed. The lines 22 are provided with a different angular or directional orientation than the lines 20. The third exposure is made through a green filter without any modulation so that a resultant image 28 is formed. Since the first, second and third exposures are made on the same film, a composite image 30 is produced on the film.

Figure 4:
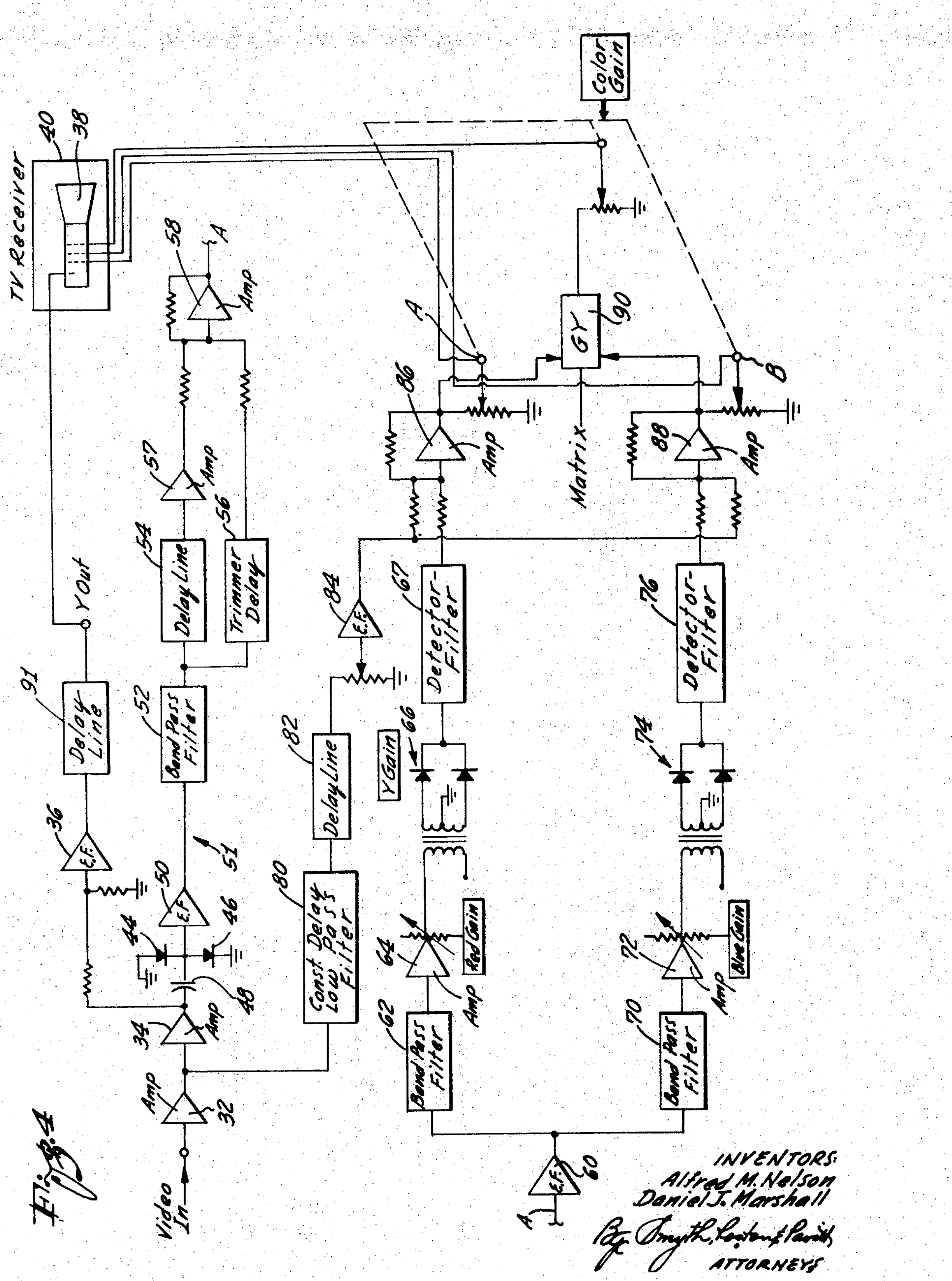
FIG. 4 is a diagram of the electrical circuitry which may be used to reprouce the color image from the composite image shown in FIG. 2.

The composite image 30 is processed by the circuitry shown in FIG 4 to reproduce the color image on the film 12. The composite image is scanned by a flying spot scanner or image tube in a well-known manner to produce at each instant signals having characteristics representing the composite image 30. The signals are amplified as at 32 and 34 and are isolated by an emitter follower 36 to produce signals which represent the luminance of the color image in the film 12. These signals are applied to the cathode of a cathode ray tube 38 in a conventional television receiver 40 in a manner similar to the normal introduction of the luminance signals in a television receiver.

The signals from the amplifier 34 are also passed through an intensity transcient limiter clipper formed from a pair of diodes 44 and 46. The cathode of the diode 44 and the anode of the diode 46 are connected to receive the signals passing from the amplifier 34 through a capacitor 48 and the anode of the diode 44 and the cathode of the diode 46 are grounded. The diodes 44 and 46 limit the amplitude of large luminance transcients of the signal from the amplifier 34 to an amplitude equal to the maximum amplitude of the color modulations; this is done to minimize spurious colors caused by luminance information getting into the chrominance channel 51. The signals from the clipper are introduced to an emitter follower 50 and are then band-passed by a filter 52 having a bandpass between 1.5 and 3.5 megacycles per second. This band-pass is designed to pass the signal components representing the color and the modulations produced by the line patterns 20 and 22 in FIG. 2.

The signals are then applied to a delay line 54 providing a delay of one horizontal line and through a delay line 56 providing an adjustable delay to insure that the difference in the delays between the lines 54 and 56 corresponds to the time required to sweep through one horizontal line. The signal from the delay line 54 is amplified and inverted by an amplifier 57 to compensate for the attenuation of the delay line and provide the proper phase to sum the two signals from the delay lines 54 and 56 such that vertical scene modulation is cancelled. The signal from the delay lines 54 and 56 are increased in amplitude by amplifier 58.

The outputs of the relatively undelayed signal from the delay line 56 and the delayed signal from the delay line 54 are averaged for an improtant reason. For example, unless an average of two successive lines is provided, a picket fence in the color image may interfere with the modulations at 2 megacycles or at 3 megacycles or may produce undesired modulations at these frequencies. By averaging the signals in two successive horizontal lines, the phase of the signals representing the picket fence in two successive horizontal lines will not correspond to the phase of the modulations produced by the lines 20 or 22 in two successive horizontal lines. This prevents the picket fence from affecting the modulations of the red color as represented by the lines 20 or the modulations of the blue color as represented by the lines 22. Ideally the spatial frequency of each of the carriers should be selected such that the modulations produced in successive scan lines should alternate 180° in phase with respect to a reference perpendicular to the scan direction.

It will be appreciated that successive pairs of horizontal lines may be simultaneously scanned and averaged to minimize any effects of the system constituting this invention on such visual items as picket fences. When successive pairs of lines are scanned, the delay line 54 may be eliminated. After each scan of a pair of lines, an advance of a single line is made in each scanner so that the first scanner scans a new line and the second scanner scans the line previously scanned by the first scanner.

The signals from the amplifier 58 are buffered by emitter follower 60. The signals from the emitter follower 60 are in turn band-passed by filter 62 which is constructed to pass signals at approximately 3 megacycles corresponding to the modulations provided for the red color. This causes only the signals representing the color red in the color image on the color film 12 to pass through the filter 62. These signals are further increased in amplitude by an amplifier 64 having an adjustable gain and are then detected in a full-wave rectifier-detector 66. The ripple is then removed by the detector filter 67.

In like manner, the signals from the amplifier 60 are band-passed by a filter 70 having band-pass characteristics at 2 megacycles to pass only the signals representing the color blue in the color image on the color film 12. These signals are then increased in amplitude by an amplifier 72 having an adjustable gain and are then detected in a full-wave rectifier-detector 74. The ripple is then removed by the detector filter 76.

The signals from the amplifier 32 are rolled off by a low pass filter 80 which operates to provide a signal representing the intensity or luminance of the image at each position on the color film 12 as the position is scanned. In other words, the filter 80 provides a signal representing the component generally designated as −Y in television engineering. The signals passing through the filter 80 are delayed by a suitable period of time such as 800 microseconds corresponding to the delay which is provided in the channel including the filters 62 and 67 and which is provided in the channel including the filters 70 and 76. The signals from the filter 82 are isolated by an emitter follower 84.

The signals representing −Y from the emitter follower 84 are added to the signals from the detector filter 67 and are increased in amplitude by an amplifier 86. The signals are added in the proper amplitude proporations so that $R-Y \equiv 0$ for a white image on the color film 12, where R corresponds to the signal produced by the amplifier 86 to represent the red component. Similarly, the signals representing −Y from the emitter follower are added with the signals representing the color blue (B) from the detector filter 76 and are increased in amplitude by an amplifier 38. The signals are added in the proper amplitude proportions so that $B-Y \equiv 0$ for a white image on the color film 12.

The signals from the amplifiers 86 and 88 are combined in a proper matrix arrangement 90 to form the signals G−Y. The matrix arrangement 90 is well known and is included in television receivers now being marketed on a commercial basis. The matrix arrangement 90 is shown as a separate stage in FIG. 4 for purposes of convenience. The signals from the amplifiers 86 and 88 and from the matrix arrangement 90 are then applied to the three grids of the cathode ray tube in the television receiver 40. The cathode of the tube in the television receiver has signals applied to it through a delay line 91 which delays the signals from the emitter follower 36 for a period of time corresponding to the delays provided by the filter 52, the delay line 54 and the amplifiers 57. The signals from the emitter follower 36 represent the intensity of the signal. The television receiver operates in a well known manner on the signals applied to the cathode and the grids of the cathode ray tube in the receiver to reproduce the color image on the face of the television receiver.

Since the modulating frequencies of 2 megacycles and 3 megacycles occur within the broadcast television video frequency spectrum, there is a tendency for the lines 20 and 22 to appear faintly on the color image that is reproduced. The modulating frequency of 2 megacycles has a greater tendency to produce a grating than the modulating frequency of 3 megacycles since the video response is considerably lower at 3 megacycles than at 2 megacycles. Because of this, the color blue is shown for the modulating frequency of 2 megacycles since it produces only approximately 10 percent of the total luminance. Higher frequencies could be utilized to reduce luminance to chrominance crosstalk and grating visibility.

The discussion above has proceeded on the basis of converting a color image such as a color photograph to a composite image on a black-and-white photograph and then operating upon the composite image to reproduce the color image. It will be appreciated, however, that a live scene may also be scanned by systems within the scope of this invention to produce modulated signals representing the live scene. Such systems use gratings somewhat similar to those shown in FIG. 3.

Figures 5, 6, 7, 8, 9:
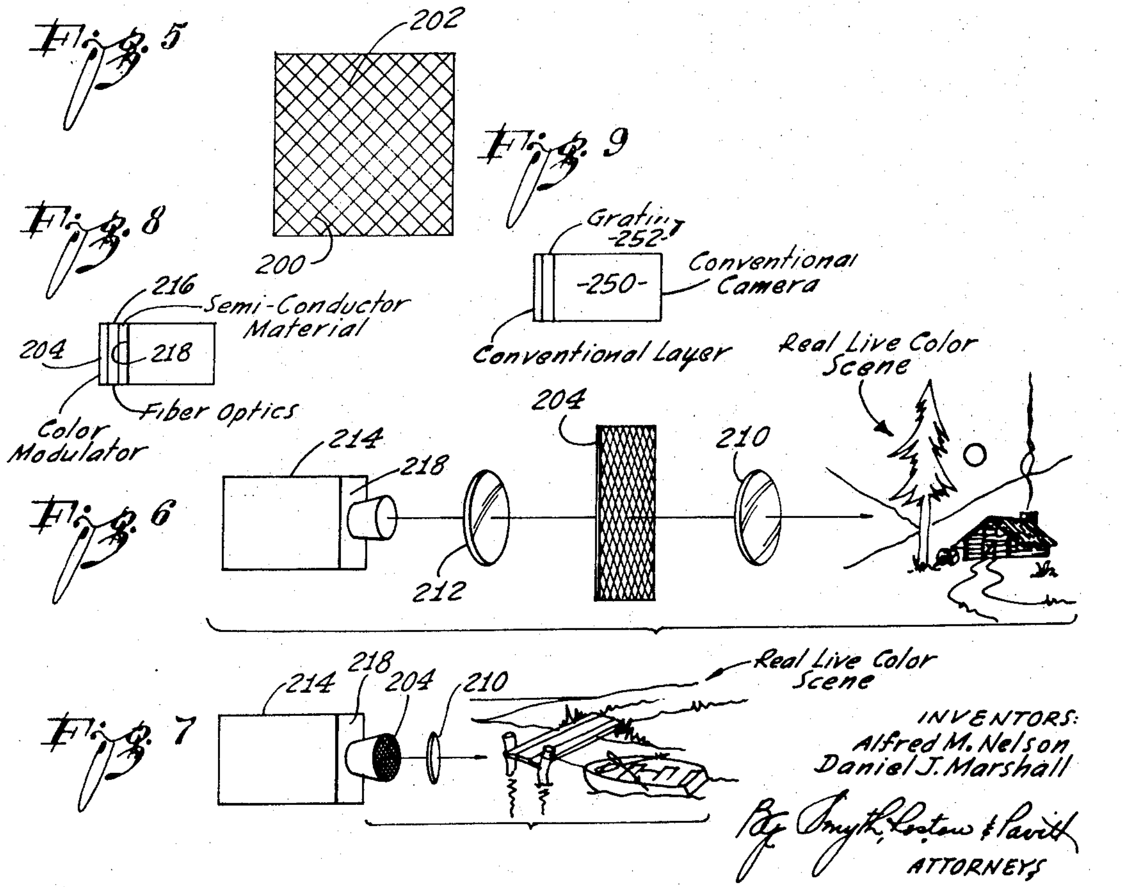
FIG. 5 is an enlarged schematic representation of gratings used to produce individual images representing different colors when a live scene is being scanned.
FIG. 6 is a schematic diagram of a system constituting this invention for operating in conjunction with the grating shown in FIG. 5 to produce signals representing the color image.
FIG. 7 is a schematic diagram of a modification of the system shown in FIG. 6.
FIG. 8 is an enlarged fragmentary illustration of the tube used in the modification shown in FIG. 7 and further illustrates layers added to the face of the tube to make the tube adaptable to the system shown in FIG. 7.
FIG. 9 illustrates a camera modified to take the composite images shwon in FIGS. 2 and 5.

FIG. 5 illustrates a grating which may be used when live scenes are to be scanned. The grating includes filter lines 200 having a yellow color transmission to pass all signal components in the color image except the color blue. The grating further includes filter lines 202 having a cyan color transmission to pass all signal components in the color image except the color red. The relative disposition of the filter lines 200 and 202 may correspond to the embodiment shown in FIG. 3 when the signals produced by the lines 200 and 202 are to have two different frequencies.

The grating shown in FIG. 5 is included as a color modulator 204 in the system schematically shown in FIG. 6. This system includes a lens 210 for focusing the image of the live scene on the modulator 204. The image on the modulator 204 is then focused by a lens 212 on a color camera 214.

The signals produced by the tube 214 in the camera may be transmitted to a position removed from the camera. The signals are then processed by a system corresponding to that shown in FIG. 4 to reproduce the color image.

FIGS. 7 and 8 illustrate a modification of the system shown in FIG. 6. In the system of FIGS. 7 and 8, the grating or color modulator 204 of FIG. 6 is disposed in contiguous relationship to the face of the color camera tube 214. A fiber optic faceplate 216 may be required to maintain resolution of the grating on the photosensitive surface of the tube 214. By disposing the color modulator 204 in contact with the fiber optic faceplate, the lens 210 can be eliminated. It will be appreciated that the grating or color modulator 204 can be disposed adjacent the color image instead of imaging a live scene onto the grating as shown in FIGS. 7 and 8.

In the embodiment shown in FIG. 9, a conventional photographic camera 250 is shown for producing the composite images shown in FIGS. 2 and 5. The camera shown in FIG. 9 has a grating 252 at the film plane corresponding to the grating or modulator 204 shown in FIG. 6. As an alternative, the grating or modulator 252 may be disposed adjacent the color image.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In a system for reproducing a color image from composite signals formed in successive lines of scan and having signal components formed from spatial modulations of a first color in a first line pattern and spatial modulations of a second color in a second line pattern having a directional orientation different from the first line pattern;

means responsive to the composite signals for averaging such signals at corresponding positions in at least a pair of successive lines of scan;

means for operating upon the averaged signals representing the composite image to recover from such signals the signal components representing the first color;

means for operating upon the averaged signals representing the composite image to recover from such signals the signal compoments representing the second color; and means for operating upon the signal components representing the first and second colors to obtain a reproduction of the color image.

2. In a system as set forth in claim 1 wherein the composite signals include signal components representing the luminance of the color image and wherein the color image is formed from a composite of the first and second colors and a third color, means responsive to the composite signals for recovering the signal components representing the luminance, means responsive to the signal components representing the luminance and the first and second colors for combining such signals to produce signal components representing the third color; and the means for obtaining the reproduction of the color image including means for operating upon the signal components representing the luminance and the third color.

3. In a system for reproducing a color image from composite signals having signal components formed from spatial modulations of a first color in a first line pattern and spatial modulations of a second color in second line pattern having a different angular relationship from the first line pattern where the composite image is obtained from successive line intervals on the composite image and, when scanned, where the modulations of the first color produce at a first frequency the signal components representing the first color and the modulations of the second color produce at a second frequency different from the first frequency the signal components representing the second color, the color image being provided as a composite image on a black-and-white medium with a representation of a first color modulated in successive lines of scan in the first line pattern and the representation of the second color modulated in the successive lines of scan in the second line pattern;

means for scanning the color image to produce the signal components at the first and second frequencies;

means responsive to the signal components at the first and second frequencies for averaging the signal components at corresponding positions in at least a pair of successive lines of scan;

electronic means responsive to the signal components from the averaging means to recover from such signal components the signal components representing the first color;

electronic means responsive to the signal components from the averaging means to recover from such signal components the signal components representing the second color; and means for operating upon the signal components representing the first and second colors to obtain a reproduction of the color image.

4. In combination for reproducing a color image from composite signals including signal components of a first color spatially modulated in a first line pattern and signal components of a second color spatially modulated in a second line pattern having a different angular relationship from the first line pattern and signal components of a third color where the composite signal represents successive line intervals on the composite image and where the signal components produced from the modulations of the first color are at a first frequency in successive lines of scan and where the signal components produced from the modulations of the second color are at a second frequency different from the first frequency in the successive lines of scan;

means for recovering the composite signal;

means responsive to the composite signal for averaging the composite signal at corresponding positions in at least a pair of successive lines of scan;

first electronic filter means responsive to the averaged composite signal for passing the modulations at the first frequency to recover the signal components representing the first color;

second electronic filter means responsive to the averaged composite signal for passing the modulations at the second frequency to recover the signal components representing the second color;

electronic means responsive to the composite signal to produce signal components representing the luminance of the color image;

electronic means responsive to the signal components representing the first and second colors and the luminance to produce signal components representing the third color; and means for operating upon the signal components representing the first, second and third colors and the luminance to reproduce the color image.

5. In combination in a system for reproducing a color image from composite signals formed in successive lines of scan and including signal components of a first color spatially modulated in a first line pattern and signal components of a second color spatially modulated in a second line pattern having a different angular relationship from the first line pattern where the composite signal represents successive line intervals on the composite image and where the signal components produced from the modulations of the first color have a first frequency in the successive lines of scan and where the signal components produced from the modulations of the second color have a second frequency different from the first frequency in the successive lines of scan;

means for recovering the composite signal;

means responsive to the composite signal for averaging the signal at corresponding positions in at least pairs of successive lines of scan;

first means responsive to the averaged composite signal for passing the signal components having the first frequency in the successive lines of scan to obtain the recovery of the signal components representing the first color in the color image;

second means responsive the averaged composite signal for passing the signal components having the second frequency in the successive lines of scan to obtain the recovery of the signal components representing the second color in the color image;

third means responsive to the composite signal to produce signal components representing the luminance of the color image;

fourth means responsive to the signal components representing the first and second colors and the luminance to produce signal components representing the third color; and fifth means for operating upon the signal components representing the first, second and third colors and the luminance to reproduce the color image.

6. In combination in a system for reproducing a color image from a composite image having a first color spatially modulated in successive lines of scan in a first line pattern and a second color spatially modulated in the successive lines of scan in a second line pattern having a different angular relationship from the first line pattern and having a third color without any modulating line pattern where the composite image is obtained from the successive lines of scan on the color image;

first means for scanning the composite image in the successive lines of scan to produce signals representing the composite image and having signal components modulated in accordance with the first and second line patterns and representing the first and second colors;

second means responsive to the signals from the first means for averaging such signals at corresponding positions in at least pairs of successive lines of scan;

third means responsive to the signals representing the composite image to produce signal components representing the luminance of the color image;

fourth means responsive to the averaged signals representing the composite image to recover the signal components representing the first color;

fifth means responsive to the averaged signals representing the composite image to recover the signal components representing the second color;

sixth means responsive to the signal components representing the first and second colors and the luminance to produce signal components representing the third color; and seventh means responsive to the signal components representing the first, second and third colors and the signal components representing the luminance for reproducing the color image.

7. In combination in a system for reproducing a color image from a composite image having a first color spatially modulated in sucessive lines of scan in a first line pattern to provide modulations at a first frequency and a second color spatially modulated in the successive lines of scan in a second line pattern having a different angular relationship from the first line pattern to provide modulations at a second frequency different from the first frequency and having a third color without any modulating line pattern where the composite image is obtained from the successive lines of scan on the color image;

first means for scanning the composite image in the successive lines of scan to produce signals representing the composite image and having signal components modulated in accordance with the first and second line patterns and representing the first and second colors;

second means responsive to the signals from the first means for averaging the signals at corresponding positions in at least pairs of successive lines of scan;

third means responsive to the signals representing the composite image to produce signal components representing the luminance of the color image;

fourth means responsive to the modulations at the first frequency in the averaged signals from the second means to recover the signal components representing the first color;

fifth means responsive to the modulations at the second frequency in the averaged signals from the second means to recover the signal components representing the second color;

sixth means responsive to the signal components representing the first and second colors and the luminance to produce signal components representing the third color; and means responsive to the signal components representing the first, second and third colors and the signal components representing the luminance for reproducing the color image.

* * * * *